June 6, 1967  J. MILLWARD  3,323,758

NOZZLE ASSEMBLY

Filed Sept. 4, 1964  2 Sheets-Sheet 1

Inventor
JAMES MILLWARD

By
Cushman, Darby & Cushman
Attorneys

June 6, 1967   J. MILLWARD   3,323,758
NOZZLE ASSEMBLY
Filed Sept. 4, 1964   2 Sheets-Sheet 2

Inventor
JAMES MILLWARD

By
Cushman, Darby & Cushman
Attorneys

United States Patent Office 3,323,758
Patented June 6, 1967

3,323,758
NOZZLE ASSEMBLY
James Millward, Nuthall, England, assignor to Rolls-Royce Limited, Derby, England, a British company
Filed Sept. 4, 1964, Ser. No. 394,438
Claims priority, application Great Britain, Sept. 9, 1963, 35,554/63
5 Claims. (Cl. 244—52)

This invention concerns nozzle assemblies and engines provided therewith.

According to the present invention there is provided a nozzle assembly comprising a rotatable jet propulsion nozzle surrounded by fairing structure, at least part of said fairing structure being fixed relative to the nozzle and being rotatable therewith.

Preferably there is a relatively small amount of fairing structure adjacent that section of the nozzle over which jet gases flow to atmosphere, and there is a relatively large amount of fairing structure around the remainder of the nozzle.

The rotatable nozzle may be provided with a cascade of vanes to turn the jet gases relative to the nozzle axis as they emerge from the nozzle.

The invention also includes a jet propulsion engine provided with a nozzle as set forth above. The engine may be disposed within a pod, the fairing structure blending with the pod. The engine may be provided with two such nozzles, disposed on opposite sides of the longitudinal axis of the engine.

The invention also includes an aircraft provided with a jet propulsion engine as set forth above.

Figure 1:
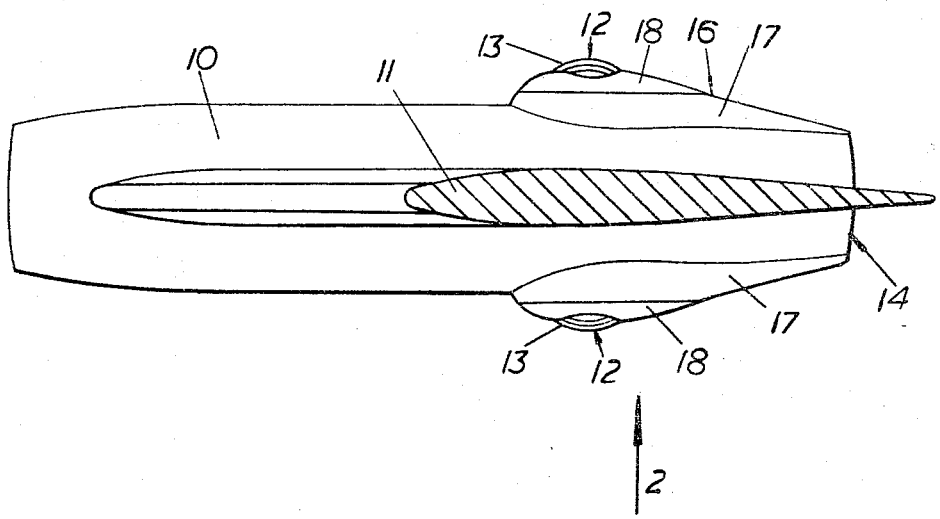
Figure 2:
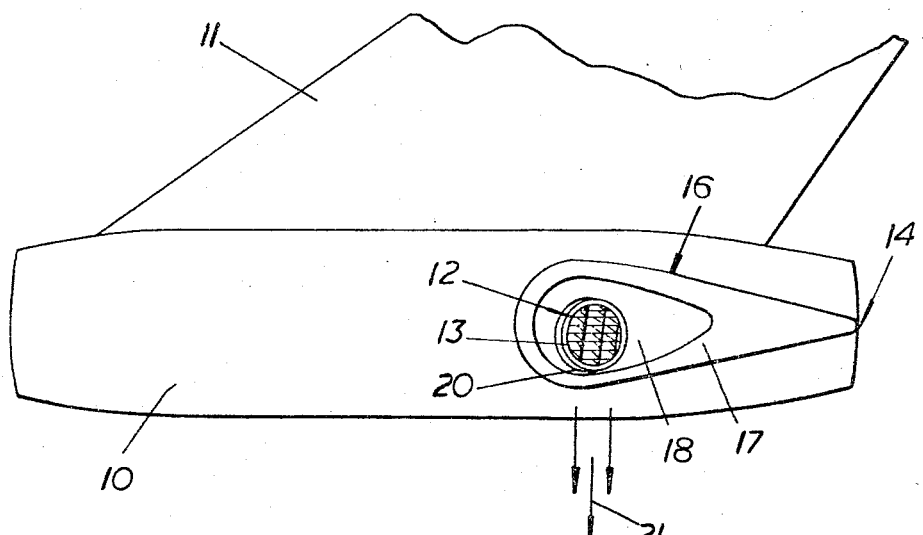
Figure 3:
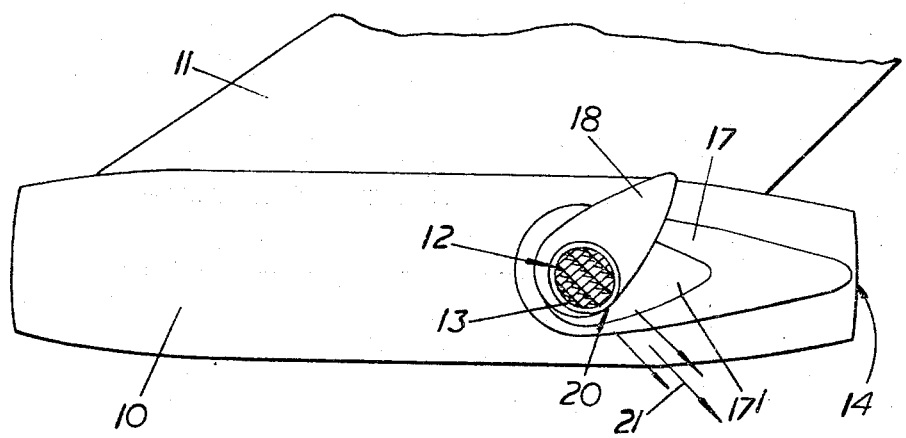
Figure 4:
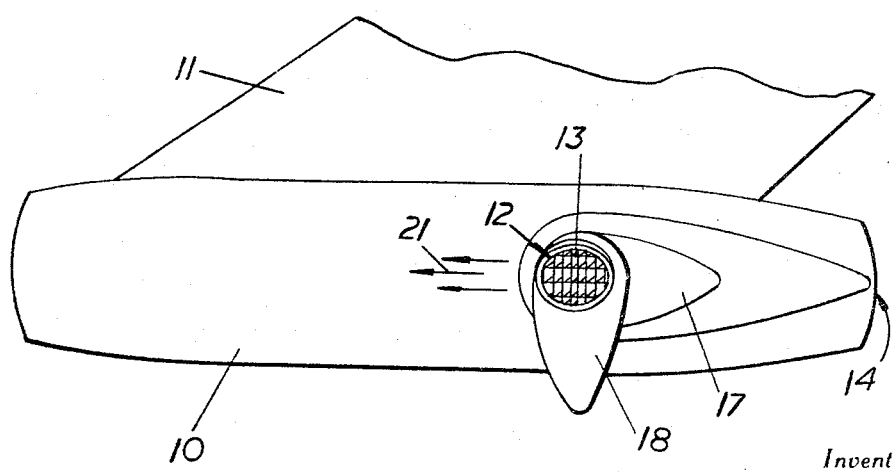

The invention is illustrated, merely by way of example, in the accompanying drawings, in which:

FIGURE 1 is a plan view, partly in section of a nozzle assembly according to the present invention, FIGURES 2–4 are side elevations of the nozzle assembly shown in FIGURE 1, but showing the components in various relative positions.

Referring to the drawings, there is shown an engine pod 10 within which there is housed a jet propulsion engine (not shown). The engine pod 10 is slung beneath the wings of an aircraft (not shown) by a support 11 of aerofoil section.

Disposed on opposite sides of the longitudinal axis of the jet propulsion engine are two identical nozzles 12, through which the jet gases from the jet propulsion engine are exhausted to atmosphere. The jet gases may exhaust to atmosphere through a further nozzle 14.

Jet gases flowing through further nozzle 14 provide forward propulsion only. Jet gases flowing through nozzles 12 may provide forward propulsion, vertical lift, or braking forces.

Thus the nozzles 12 are rotatable about their axes, and are provided with cascades of vanes 13 which turn the jet gases flowing through the nozzles relative to the nozzle axes. The cascades of vanes may turn the jet gases through 90° with respect to the axes of the nozzles, and thus it is possible to vary the direction of the exhausting jet gases by simply rotating the nozzles 12 about their axes. With the nozzles 12 in the position shown in FIGURES 1 and 2, the jet gases are directed vertically downwardly to provide direct vertical lift, in the relative position shown in FIGURE 3, the jet gases provide combined vertical lift and direct thrust, and in the relative position shown in FIGURE 4 the jet gases provide braking forces. It will be appreciated that any intermediate positions of the nozzles 12 may be used to provide any desired direction of flow of the jet gases.

As clearly seen in FIGURE 1, nozzles 12 are disposed with their axes at an angle to the longitudinal axis of the jet propulsion engine, and they project beyond the fairing structure provided by pod 10. To reduce the drag which these projecting nozzles produce, further fairing structures 16 are provided about the nozzles 12. The fairing structures 16 substantially completely cover the projecting nozzles 12 and blend with the pod 10 to thereby provide a smooth contour with minimum drag. Each nozzle 12 with its associated fairing structure 16 forms a "nozzle assembly."

The fairing structures 16 are composed of two sections, static sections 17 which are fixed relative to the pod 10 and rotatable sections 18 which are fixed relative to the nozzles 12 and are rotatable therewith. As clearly seen in FIGURES 2 to 4, rotatable sections 18 rotate with nozzles 12 and move relatively to the static sections 17.

It will be noted from the drawings that a portion 20 of each rotatable section 18 is disposed adjacent the section of the nozzle 12 over which the jet gases, indicated at 21, always flow to atmosphere. These portions 20 will be seen to be only a relatively small proportion of the rotatable sections 18, the nozzles 12 being disposed almost at the edges of the rotatable sections 18 at these points.

Thus with the present invention, the jet gases exhausting to atmosphere are kept away from the fairing structure 16 to thereby minimise the risk of the structure being affected by the heat of the jet gases. The fairing structure is, generally, of a relatively low melting point metal alloy, and the jet gases would melt or at least soften the fairing structure if they were to flow over its surface.

Thus, by placing each nozzle 12 adjacent the edge of the fairing structure 16, and always keeping the jet gases flowing over this section 20 of the fairing structure, the jet gases are always directed over a very small portion only of the fairing structure.

Surface 17' of static section 17 of the fairing structure may be subjected to the flow of the hot exhaust gases in some positions of the nozzle assembly such, for example, as that shown in FIGURE 3. The surface 17' is therefore covered in a layer of steel or other high melting point alloy, such, for example as that sold under the trademark "Nimonic" to provide a protective coating.

Rotatable section 18 can of course constitute any desired proportion of the fairing structure 16, and, indeed, it would be possible to make the whole of the fairing structure 16 rotatable with nozzles 12.

Instead of projecting from an engine pod, nozzles 12 may, of course, be attached to an aircraft fuselage or may project from the wings of an aircraft.

It is not necessary for cascades of vanes to be provided, since the nozzles 12 could be formed from ducts which themselves turn the jet gases through an angle.

I claim:

1. A nozzle assembly for a jet propulsion engine mounted on an aircraft comprising a rotatable jet propulsion nozzle having an outlet periphery and having means for deflecting jet gases passing therefrom relative to the nozzle axis at directions dependent upon rotative position of the nozzle, and fairing structure surrounding said nozzle, said fairing structure comprising a fixed part and a rotatable part, said rotatable part being fixed to the nozzle and rotatable therewith relative to the fixed part.

2. A nozzle assembly as claimed in claim 1 in which said rotatable part of said fairing structure has a relatively small portion thereof disposed adjacent a part of the outlet periphery of said nozzle over which jet gases flow to atmosphere and a relatively large portion thereof disposed around the remainder of the outlet periphery of said nozzle.

3. A nozzle assembly as claimed in claim 1 in which said means is a fixed cascade of vanes provided in said nozzle to deflect the jet gases relative to the nozzle axis as they emerge from the nozzle.

4. In combination, a jet propulsion engine, a pod within which the engine is disposed and a nozzle assembly for the engine, said nozzle assembly comprising a rotatable jet propulsion nozzle for deflecting jet gases passing therethrough relative to the nozzle axis, and fairing structure surrounding the periphery of the nozzle and having an outwardly convex curved shape, said fairing structure having a fixed part and a rotatable part which is fixed to the nozzle and which is rotatable therewith relative to the fixed part.

5. A jet propulsion engine as claimed in claim 4 wherein two said nozzle assemblies for the engine are disposed on opposite sides of the longitudinal axis of the engine.

References Cited

UNITED STATES PATENTS

| | | | |
|---|---|---|---|
| 2,762,584 | 9/1956 | Price | 244—52 X |
| 2,840,324 | 6/1958 | Smith | 244—52 |
| 3,109,609 | 11/1963 | Dornier | 244—52 X |
| 3,126,170 | 3/1964 | Dornier | 244—52 X |
| 3,193,217 | 7/1965 | Marchant et al. | 244—52 X |

MILTON BUCHLER, *Primary Examiner.*

B. BELKIN, *Assistant Examiner.*